United States Patent [19]
Ohtsuka et al.

[11] Patent Number: 5,344,564
[45] Date of Patent: Sep. 6, 1994

[54] METHOD FOR REMOVING EXTRACTION SOLVENT FROM EXTRACTION RESIDUE TRAPPED IN AN OIL-AND-FAT EXTRACTOR

[75] Inventors: Yuzuru Ohtsuka, Tokyo; Kiyoji Suzuki; Toru Nakamura, both of Chiba, all of Japan

[73] Assignees: Ajinomoto Co., Inc., Tokyo; Toyo Oil Mills Co., Inc., Chiba, both of Japan

[21] Appl. No.: 83,440

[22] Filed: Jun. 29, 1993

[30] Foreign Application Priority Data
Jun. 29, 1992 [JP] Japan .................................. 4-171162

[51] Int. Cl.$^5$ ............................................. B01D 11/04
[52] U.S. Cl. ..................... 210/634; 210/180
[58] Field of Search ....................... 426/417, 429, 430; 210/634, 180, 182

[56] References Cited

FOREIGN PATENT DOCUMENTS 289708  5/1991  Fed. Rep. of Germany ...... 426/430

*Primary Examiner*—Frank Spear
*Attorney, Agent, or Firm*—Oblon, Spivak, McClelland, Maier & Neustadt

[57] ABSTRACT

A method for removing an organic extraction solvent from an extraction residue, which is characterized in that an oil or fat is allowed to contact an extraction residue remaining in an oil-and-fat extractor which contains an organic solvent, and the oil or fat is then drawn out of said extractor. The procedures of allowing oil or fat to contact said residue and of drawing the oil or fat out of said extractor are repeated until the density of the solvent in the atmosphere of said extractor becomes lower than the lowest ignitable limit.

7 Claims, No Drawings

METHOD FOR REMOVING EXTRACTION SOLVENT FROM EXTRACTION RESIDUE TRAPPED IN AN OIL-AND-FAT EXTRACTOR

BACKGROUND OF THE INVENTION

Field of the Invention

The present invention relates to a method for efficiently removing an organic extraction solvent from an extraction residue while the residue is in an oil-and-fat extracting apparatus (or oil-and-fat extractor), so that, upon malfunction of the extractor, the concentration of the solvent in the atmosphere of the extractor can be reduced to a level lower than the minimum ignitable limit.

Discussion of the Background

In an oil-and-fat extractor, oilseed such as soybean, rapeseed, corn, sunflower seed, cotton seed and the like, are separated into (i) oil and fat and (ii) residue, by using an organic extracting agent, for example, hexane. Various types of extractors have been used for the separation, including Rotocel®, Lurgi®, De Smet® and Crown® extractors. In principle, these extractors work in a similar manner and are capable of separating oil-and-fat from oil seeds.

There are cases where an extractor stops due to mechanical trouble during the course of extraction, thereby making it impossible to draw out the extraction residue remaining in the extractor. In order to rectify the trouble, a person may have to enter the interior of the extracton. However, if a high concentration of organic solvent is contained in the atmosphere of the extractor, it may cause fire or explosion even when no fire is used in the extractor since fire or explosion can be caused by an electric spark generated by static charge or an accidental contact or collision between metals. Therefore, the concentration of solvent in the atmosphere of the extractor must be reduced to a level lower than the lowest ignitable limit. Organic solvents which are not contained in the residue can be drawn out of the extractor with no difficulty. However, it can be troublesome to draw out organic solvents contained in the extraction residue in a reliable and effective manner.

Heretofore, the removal of organic solvents contained in the extraction residue has been effected by passing air or blowing steam through the residue. An extremely long period of time is required to remove organic solvents contained in the extraction residue according to these prior methods. For example, when air was passed through an extractor of a capacity of 60 tons for a period of 3 days to remove organic solvents through diffusion, the layer of extraction residue still formed a detonatable gas. Even in the case of steam blowing, it is difficult to remove the organic solvent from the layer of extraction residue in a uniform manner within a short period of time. Furthermore, the organic solvent, if released into the atmosphere, could cause air pollution. It has therefore been desired to develop a method which enables one to remove a large quantity of organic solvent remaining in the extractor in a simple manner within a short period of time.

SUMMARY OF THE INVENTION

Accordingly, one object of this invention is to provide a novel method for efficiently removing organic solvents contained in an extraction residue from an extractor within a short period of time. The organic solvent is removed by (i) allowing an oil or fat to contact an organic solvent-containing extraction residue, in an oil-and-fat extractor, so that the solvent contained in the residue is absorbed by the oil or fat, and then (ii) drawing the oil or fat out of the apparatus. The oil or fat injected into the apparatus absorbs and removes not only organic solvent attached to, or contained in, the extraction residue, but also organic solvent contained in the atmosphere within the residue, as well as organic solvent contained in, or attached to, the apparatus.

DETAILED DESCRIPTION OF THE PREFERRED EMBODIMENTS

It has been found that an organic solvent contained in an extraction residue can be efficiently removed by contacting the residue with an oil or fat which can extract the solvent to be removed.

Accordingly, the present invention is concerned with a method for removing an organic extraction solvent from an extraction residue, which is characterized in that an oil or fat is allowed to contact an extraction residue while it is remaining in an oil-and-fat extractor in a state containing an organic solvent, and the oil or fat is then drawn out of the extractor. The procedures of allowing the oil or fat to contact said residue and of drawing the oil or fat out of said extractor are repeated until the concentration of the extraction solvent in the atmosphere of the extractor becomes lower than the lowest ignitable limit.

The oil-and-fat extractor may be of a batch, semi-continuous or full-continuous system. Specific examples of usable oil-and-fat extractors include Rotocel®, Lurgi®, De Smet® and Crown® extractors.

The term "extraction residue" means a residue from which oils and fats have been extracted, for example, soybean residue, rapeseed residue, corn residue, sunflower seed residue, cotton seed residue, or the like. In order to improve the efficiency of extracting oils and fats, these materials are usually subjected to such treatment as steaming, pressing, pulverization and/or squeezing.

Examples of organic solvents used for the extraction of oils and fats include $C_5$–$C_{10}$-hydrocarbon, such as hexane, and $C_2$–$C_6$-alkanols such as isopropanol, ethanol, and the like. These solvents can be used in the form of a mixture. Hexane is conventionally used.

As an oil or fat, there can be used those extractable with any of the above-mentioned organic extraction solvents, including, e.g., soybean oil, rapeseed oil, corn oil, cotton seed oil, palm oil, and the like. In usual cases, there is used the same oil or fat as the one contained in the extraction residue. It is, however, possible to use another oil or fat in cases where a mixed oil is to be produced or there is a special purpose. Purity of the oil or fat does not matter at all, and any oil or fat can be used, including crude extracted oil or fat, as well as a final product purified via such purification steps as treatment with alkali, and deodorization. Oil or fat is used until the presence of solvent in the atmosphere of the extractor becomes less than the minimum ignitable limit. In usual cases, oil or fat is required in a quantity not less (based on volume) than the residue. Using a larger volume of oil or fat can be advantageous with regard to the reduction in the level of solvent. From a practical point of view however, it can be advantageous to use oil or fat in a volume of about 1 to 5 times, in particular about 3 to 4 times, that of the residue.

The method of the present invention is practiced when it is necessary to repair an extractor after the apparatus has come to a stop due to a malfunction or the like. When the need for repair arises, the organic solvent remaining in the apparatus is recovered, and an oil or fat is then introduced thereinto. Since oils and fats are injectable, they can simply be injected into the extractor. In usual cases, an oil or fat is injected through an organic solvent-washing nozzle positioned in the upper part of the extractor, so that it can pass through the residue to wash out the solvent. The injection of oil or fat into the extractor can be effectively carried out by force-feeding an oil or fat by use of a pump or the like. Extractors may be washed individually with an oil or fat. It is also possible to wash a series of extractors by passing an oil or fat through the extractors. The resultant solvent-containing washing can be forwarded into a distillation apparatus, wherein the organic solvent is separated from oil or fat and recovered.

After the completion of the above operations, the concentration of the vapor of the organic solvent in the extractor is measured, confirming safety and making it possible to commence any repair work. After the apparatus has been restored to working order, an organic solvent can be injected through the washing nozzle positioned in the upper part of the extractor, so as to recover the oil or fat from the resultant residue.

Other features of the invention will become apparent in the course of the following descriptions of exemplary embodiments which are given for illustration of the invention and are not intended to be limiting thereof.

EXAMPLE 1

A test for removing an organic solvent in extraction residue was carried out by using one cell of a commercial extractor. Into a steel cylinder of 260 mm diameter ×2,500 mm height, equipped with a 14-mesh wire gauze at the bottom and sealable at the bottom and top, was charged 50 kg of soybean extraction residue containing 28% of hexane (soybean residue, 36 kg+hexane, 14 kg), up to a height of 2,000 mm. Then, 50 kg of alkali-refined soybean oil at a temperature of 60° C. was poured on the layer of soybean extraction residue whereby an oil layer of 3 to 5 cm was formed on the residue layer and the oil penetrated uniformly onto the residue layer A period of approximately 3 minutes was required for the operation.

The system was allowed to stand for 20 minutes, and the alkali-refined oil separated from the extraction residue layer and was collected. This washing operation was repeated twice (three times in total). After each of the washing operations the content of hexane contained in the extraction residue, the content of hexane contained in the washing oil and the concentration of hexane in the air contained in the head space of the extraction cylinder were determined. The results are shown in Table 1.

The ignitable content of hexane in air is from 1.25% to 6.90%. It is apparent from Table 1 that the content of hexane in the air at the top of the cylinder can be reduced below the minimum ignitable limit by washing the extraction residue containing a large quantity of hexane with an equal quantity of oil.

TABLE 1

| Times of Washing | Content of Hexane in Residue | Washing Oil Amount Passed | Washing Oil Content of Hexane | Content of Hexane in The Air at the Cylinder Top (Vol.) |
|---|---|---|---|---|
| Before Washing | 28% | — | — | 6.0% |
| After 1st Washing | 0.25% | 27 kg | 49.5% | 1.0% |
| After 2nd Washing | 0.15% | 45 kg | 0.18% | 0.6% |
| After 3rd Washing | 0.05% | 47 kg | 0.13% | 0.2% |

According to the invention, an organic solvent contained in an extraction residue remaining in the extraction chamber of an extractor can be effectively removed and recovered using an oil or fat in less time and with less loss of organic solvent than previous methods have provided. Consequently, the density of solvent in the apparatus can be markedly reduced to a safe level quickly, and hence the restoration of the extractor can be done with safety more quickly. The present method can be free from the problem of air pollution since the vapor of the solvent is not released into the atmosphere.

Obviously, numerous modifications and variations of the present invention are possible in light of the above teachings. It is therefore to be understood that within the scope of the appended claims, the invention may be practiced otherwise than as specifically described herein.

We claim:

1. In a process for removing an organic extraction solvent from an extraction residue contained in an oil-and-fat extractor, the improvement comprising: contacting said extraction residue with an oil or fat so that said solvent is removed from the extraction residue, and solvent contained in the atmosphere of said extractor is reduced to a level below the minimum ignitable limit.

2. The process of claim 1 wherein the volume of oil or fat is 1 to 5 times the volume of the extraction residue.

3. The process of claim 1 wherein the volume of oil or fat is 3 to 4 times the volume of the extraction residue.

4. The process of claim 1 wherein the solvent is hexane.

5. The process of claim 1 wherein the oil or fat is the same as that contained in the extraction residue.

6. The process of claim 1 wherein the extraction residue is contacted with soybean oil, rapeseed oil, corn oil, cotton seed oil or palm oil.

7. The process of claim 1 wherein the extraction residue is contacted with oil or fat repeatedly.

* * * * *